US012415336B2

(12) United States Patent
Monson et al.

(10) Patent No.: US 12,415,336 B2
(45) Date of Patent: *Sep. 16, 2025

(54) DISPERSIBLE ADHESIVELY BONDED TISSUE LAMINATE

(71) Applicant: Kimberly-Clark Worldwide, Inc., Neenah, WI (US)

(72) Inventors: Robert S. Monson, Appleton, WI (US); Nicholas S. Wolter, Greenville, WI (US); Daniel M. Piette, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/404,386

(22) Filed: Jan. 4, 2024

(65) Prior Publication Data

US 2024/0149555 A1 May 9, 2024

Related U.S. Application Data

(60) Continuation of application No. 18/129,257, filed on Mar. 31, 2023, which is a division of application No.
(Continued)

(51) Int. Cl.
*B32B 5/26* (2006.01)
*A47K 10/16* (2006.01)
(Continued)

(52) U.S. Cl.
CPC ............... *B32B 5/26* (2013.01); *A47K 10/16* (2013.01); *B32B 7/12* (2013.01); *B32B 37/1207* (2013.01);
(Continued)

(58) Field of Classification Search
CPC ........... A47K 10/16; B32B 5/26; D21F 11/00; D21F 11/006; D21F 11/02; D21F 11/04
See application file for complete search history.

(56) References Cited

U.S. PATENT DOCUMENTS

| 5,607,551 A | 3/1997 | Farrington, Jr. et al. |
| 5,906,711 A | 5/1999 | Barnholtz |

(Continued)

FOREIGN PATENT DOCUMENTS

| EP | 0782644 B1 | 11/2001 |
| EP | 1312466 B1 | 6/2006 |
| WO | 2022066164 A1 | 3/2022 |

OTHER PUBLICATIONS

LDDAVIS, "Glue Used for Paper Towel Manufacturing", https://blog.lddavis.com/glue-used-tissue-paper-towel-manufacturing.
(Continued)

*Primary Examiner* — Zachary M Davis
(74) *Attorney, Agent, or Firm* — KIMBERLY-CLARK WORLDWIDE, INC.

(57) ABSTRACT

Disclosed is a dispersible adhesively bonded wet tissue laminate and more particularly a dispersible wet wipe comprising two or more adhesively bonded tissue plies. Generally, the wipe comprises first, and second tissue plies adhesively bonded to one another by an adhesive, particularly a triggerable binder, disposed at the interface of the plies. The first and second tissue plies preferably comprise fibrous tissue plies and more preferably wet-laid tissue plies consisting essentially of conventional papermaking fibers. The adhesively bonded laminates are generally strong enough to withstand use, such as having a geometric mean wet tensile strength (GMWT) greater than about 250 g/in, but disperse quickly in water, such as having a Slosh Time less than about 60 minutes.

20 Claims, 5 Drawing Sheets

Related U.S. Application Data

17/763,240, filed as application No. PCT/US2019/053168 on Sep. 26, 2019, now Pat. No. 11,642,868.

(51) Int. Cl.
 *B32B 7/12* (2006.01)
 *B32B 37/12* (2006.01)

(52) U.S. Cl.
 CPC . *B32B 2037/1253* (2013.01); *B32B 2260/046* (2013.01); *B32B 2307/54* (2013.01)

(56) References Cited

U.S. PATENT DOCUMENTS

| | | |
|---|---|---|
| 5,919,556 A | 7/1999 | Barnholtz |
| 6,162,327 A | 12/2000 | Batra et al. |
| 6,187,141 B1 | 2/2001 | Takeuchi et al. |
| 6,309,731 B1 | 10/2001 | Takeuchi et al. |
| 6,395,133 B1 | 5/2002 | McNeil |
| 6,878,238 B2 | 4/2005 | Bakken et al. |
| 6,924,042 B2 | 8/2005 | Von Paleske |
| 8,455,077 B2 | 6/2013 | Vinson et al. |
| 9,719,213 B2 | 8/2017 | Miller, IV et al. |
| 11,904,592 B2 * | 2/2024 | Monson ............ A47K 10/16 |
| 2011/0008631 A1 | 1/2011 | Lindqvist |
| 2012/0160436 A1 | 6/2012 | Zwick et al. |
| 2012/0297560 A1 | 11/2012 | Zwick et al. |
| 2015/0330029 A1 | 11/2015 | Ramaratnam et al. |
| 2016/0067118 A1 | 3/2016 | Hammons et al. |
| 2018/0140529 A1 | 5/2018 | Miller, IV et al. |
| 2019/0021553 A1 | 1/2019 | Saas et al. |
| 2019/0226149 A1 | 7/2019 | Vogel et al. |
| 2019/0366677 A1 | 12/2019 | Kleinwaechter et al. |

OTHER PUBLICATIONS

KAPPASIL, "KAPPASIL glues for high-standard lamination", Stockmeier, https://www.stockmeier.com/en/products/tissue-textile/tissue/glues/.

Amazon, "Amazon Brand—Solimo 2 Ply Kitchen Tissue Paper Roll—4 Rolls (60 Pulls Per Roll)", https://www.amazon.in/Amazon-Brand-Solimo-Kitchen-Tissue/dp/B07MJF5THB.

* cited by examiner

DISPERSIBLE ADHESIVELY BONDED TISSUE LAMINATE

BACKGROUND

Pre-moistened wipes are popular in the marketplace, including, for example, baby wipes, toddler wipes, surface cleaning wipes, feminine wipes, hemorrhoid wipes, make-up removal wipes, and child and adult toileting wipes. Consumers flush many of these wipes down the toilet. Some of the wipes are designed to be flushed and labeled as such. It is important that wipes that are intended to be flushed are compatible with sewer and septic systems, but also important that such wipes do not fall apart when used for their intended purpose. Specifically, when a flushable disposable product is flushed down a toilet into sewer or septic systems, the product, or designated portions of the product, should degrade or lose strength as it moves through various steps of wastewater processing.

One common approach to making a flushable wet wipe is using "hydroentangling" technology, in which fibers, primarily or exclusively cellulosic fibers, are "entangled" together using very small high-pressure water jets. However, some wipes made with this technology require a substantial amount of agitation to break apart after flushing, and some wipes, if made to have a very high initial strength, may not lose significant strength in relatively static environments.

Another conventional approach to making a wet wipe that exhibits satisfactory in-use strength, but that adequately breaks down in sewer or septic systems, is via the use of a binder on a substrate comprising cellulose fibers. The binder attaches to cellulose fibers, and bonds those fibers together in a network to deliver in-use strength. The binder is stable and delivers this strength when soaking in a stabilizing solution but swells and weakens in the tap water of the toilet and sewer system, thus allowing the fiber network to break apart. The strength of the wipe can be manipulated by varying the amount of binder used and the process conditions by which the binder is applied, such as how and when it is applied to the wipe substrate, and by varying the time and temperature at which the binder is dried/cured.

One variant of such a binder/stabilizing solution is a salt-sensitive triggerable binder, such as that disclosed in U.S. Pat. No. 6,994,865. The binder holds the fibers of the wet wipe together when soaked in a salt solution, which stabilizes the binder. When the salt solution is washed away, the binder swells and fails, and the wipes lose strength. However, such binders can be relatively expensive, and it can be challenging to achieve the right balance of in-use strength and post-flush degradation when using such binders. For example, the binder add-on level can be reduced to improve dispersibility and reduce cost, but in-use strength (during toileting) can suffer. Conversely, the binder add-on can be increased to improve in-use performance (during toileting), but dispersibility can suffer, and cost increases.

What is needed is a cellulose-based wipe that combines sufficient in-use strength, adequate strength loss after flushing even in relatively non-turbulent water, and that is cost-effective.

SUMMARY

The present invention provides a dispersible adhesively bonded wet tissue laminate and more particularly a dispersible mutli-ply wet tissue product comprising a first wet-laid tissue ply and a second wet-laid tissue ply adhered to one another by an adhesive and more specifically a triggerable binder. Generally, the triggerable binder is disposed between the plies to adhere them to one another. The triggerable binder may be applied to an outer surface of one, or both of, the wet-laid tissue plies prior to passing the plies through a nip, followed by curing of the binder. In this manner, the wet tissue products of the present invention may comprise outer surfaces that are substantially free from a triggerable binder but have a triggerable binder disposed on the interior along the interface of the two layers. Selectively disposing the adhesive between layers adheres the layers together to provide sufficient strength in use but facilitate break-up when the product is flushed.

Accordingly, in certain embodiments, the present invention provides a dispersible adhesively bonded wet tissue laminate comprising a first wet-laid tissue ply and a second wet-laid tissue ply arranged in facing relation to one another and a triggerable binder disposed there between. In certain instances, it may be preferable that each of the wet-laid tissue plies be similarly manufactured. For example, both plies may be through-air dried tissue plies. In still other instances, it may be desirable that each of the wet-laid tissue plies be structurally similar to one another such as, for example, having a similar furnish composition, basis weight, sheet bulk, or geometric mean tensile strength.

In other embodiments the invention provides a dispersible adhesively bonded wet tissue laminate comprising: a first tissue ply and a second tissue ply, each ply having a first outer surface and a second outer surface, the first and second plies arranged in facing relation with one another such that the second outer surfaces face one another; an adhesive disposed between the first and second tissue ply second outer surfaces. The adhesively bonded tissue laminate further comprises a wetting composition, particularly an aqueous wetting composition comprising an insolubilizing agent such as a salt.

In a particularly preferred embodiment, the tissue products of the present invention are provided in a wet format, i.e., they contain a wetting composition added to a dry tissue laminate at add-ons ranging from about 10 to about 600 percent, based upon the weight of the dry tissue laminate. Despite being wet, the products are relatively strong, such as having s a geometric mean wet tensile strength (GMWT) greater than about 250 g/in, yet are readily dispersed when flushed, such as having a Slosh Time less than about 60 minutes.

In still other embodiments a dispersible adhesively bonded wet tissue laminate comprising: a first through-air dried tissue ply having a basis weight from about 15 to about 35 gsm and a second through-air dried tissue ply having a basis weight from about 15 to about 35 gsm, each ply having a first and a second outer surface, the first and second plies arranged in facing relation with one another such that the second outer surfaces face one another; a cationic polyacrylate adhesive and a cobinder selected from the group consisting of poly(ethylene-vinyl acetate), poly(styrene-butadiene), poly(styrene-acrylic), a vinyl acrylic terpolymer, a polyester latex, an acrylic emulsion latex, polyvinyl chloride), ethylene-vinyl chloride copolymer and a carboxylated vinyl acetate latex, disposed between the first and second tissue ply second outer surfaces, wherein the add-on of adhesive and cobinder ranges from about 3 to about 10 grams per square meter of tissue laminate.

In yet other embodiments a method of making a dispersible adhesively bonded wet tissue laminate: (a) providing a first wet-laid tissue web having a first surface and a second surface; (b) providing a second wet-laid tissue web having a first surface and a second surface; (c) applying an adhesive to the first surface of the first wet-laid tissue web; (d) after applying the adhesive to the first surface bringing the first surface into facing relation with the first surface of the second wet-laid tissue web; (e) passing the first and second wet-laid tissue webs through a nip to form and adhesively bonded wet tissue laminate and (f) applying a wetting composition.

DEFINITIONS

As used herein the term "machine direction" or "MD" generally refers to the direction in which a tissue web or product is produced. The term "cross-machine direction" or "CD" refers to the direction perpendicular to the machine direction.

As used herein, the term "basis weight" generally refers to the bone-dry weight per unit area of a product, such as a tissue ply or an adhesively bonded tissue laminate comprising two or more tissue plies. Basis Weight is generally expressed as grams per square meter (gsm). Basis weight is measured using TAPPI test method T-220.

As used herein, the term "ply" refers to a discrete product element. Individual plies may be arranged in juxtaposition to each other. The term may refer to a plurality of web-like components such as in an adhesively bonded tissue laminate, which may comprise two, three, four or more individual plies arranged in juxtaposition to each other where one or more plies may be attached to one another such as by an adhesive.

As used herein, the term "layer" refers to a plurality of strata of fibers, chemical treatments, or the like, within a given ply.

As used herein the term "wet-laid tissue web" generally refers to a tissue web that has been manufactured by forming an aqueous suspension of papermaking fibers, depositing the aqueous suspension on a travelling, water pervious, forming fabric to form a fibrous web and draining water through the fabric to partially dewater the fibrous web.

As used herein the term "adhesive" generally refers to a composition comprising a triggerable binder. In certain non-limiting embodiments, the triggerable binders may comprise the polymerization product of a vinyl-functional cationic monomer, a hydrophobic vinyl monomer with a methyl side chain, and one or more hydrophobic vinyl monomers with alkyl side chains of 1 to 4 carbon atoms, such as disclosed in U.S. Pat. No. 7,157,389, the contents of which are incorporated herein in a manner consistent with the present disclosure. In certain instances, the adhesive may comprise a triggerable binder and a cobinder such as, for example, a vinyl-acetate ethylene latex.

As used herein the term "triggerable binder" generally refers a composition capable of adhering two tissue plies together to create a laminate according to the present invention that is insoluble in a wetting composition comprising an insolubilizing agent but is dispersible or soluble in disposal water such as that found in the toilet tank, toilet bowl, or waste water system. In certain instances the triggerable binder may be a "salt triggerable binder" that is insoluble in a wetting composition comprising a predetermined concentration of sodium chloride, sodium sulfate, sodium citrate, potassium, or other mono or divalent salt acting as the insolubilizing agent, but is dispersible or soluble in disposal water such as that found in the toilet tank, toilet bowl, or waste water system.

DETAILED DESCRIPTION

Figure 1:
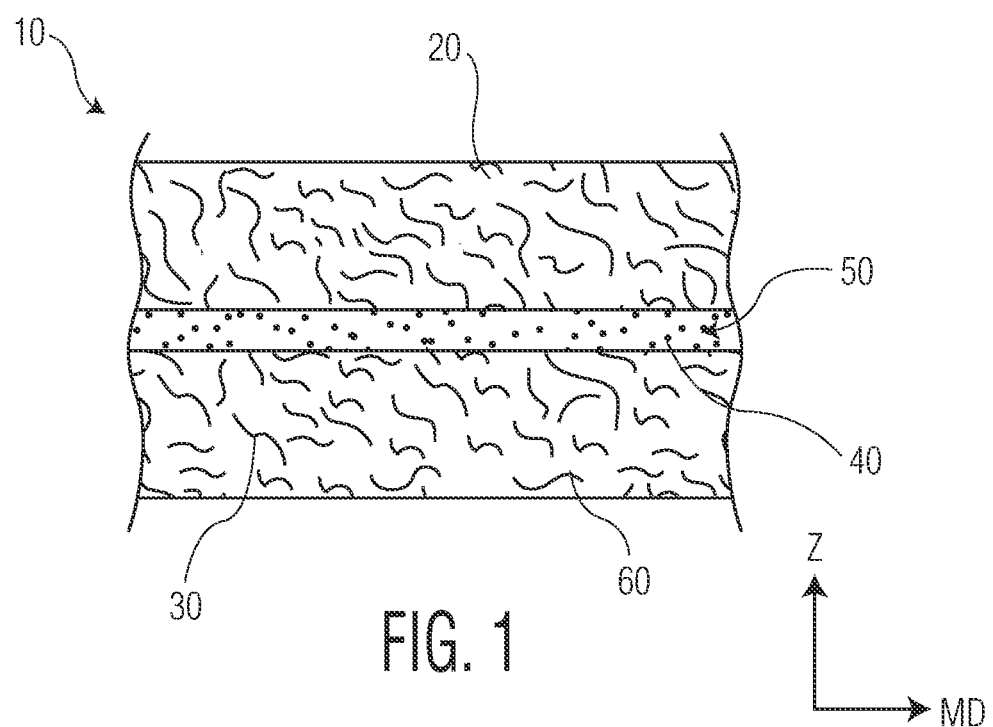
FIG. 1 illustrates a two-ply dispersible wet wipe of the present invention.

The present disclosure generally relates to water dispersible adhesively bonded wet tissue laminates and more particularly dispersible wet wipes comprising two or more adhesively bonded tissue plies. In particular embodiments, such as that illustrated in FIG. 1, a wipe 10 comprises first and second tissue plies 20, 30 adhesively bonded to one another by an adhesive 40 disposed at the interface 50 of the plies. The first and second tissue plies 20, 30 preferably comprise fibrous tissue plies and more preferably wet-laid tissue plies consisting essentially of conventional papermaking fibers 60.

Conventional papermaking fibers include, for example, wood and non-wood cellulosic fibers, including both bleached and unbleached fibers, virgin and recovered or recycled fibers. Particularly preferred papermaking fibers include hardwood and softwood fibers that have been mechanically pulped (e.g., groundwood), chemically pulped (including but not limited to the kraft and sulfite pulping processes), thermomechanically pulped, chemithermomechanically pulped, and the like. The mixtures of any subset of the above mentioned or related fiber classes may be used.

In certain preferred embodiments the dispersible adhesively bonded wet tissue laminates of the present invention comprise first and second tissue plies, where each of the tissue plies are wet-laid tissue plies and consist essentially of wood pulp fibers, particularly softwood kraft pulp fibers and more preferably Southern softwood kraft pulp fibers.

While in certain embodiments it may be preferable to form the tissue plies entirely from a single fiber type, such as softwood kraft pulp fibers, in other instances the plies may combine two or more fiber types. For example, a headbox may be stratified to permit production of a multi-layered structure from a single headbox jet in the formation of a web. In particular embodiments, the web is produced with a stratified or layered headbox to preferentially deposit shorter fibers on one side of the web for improved softness, with relatively longer fibers on the other side of the web or in an interior layer of a web having three or more layers. The web is desirably formed on an endless loop of foraminous forming fabric which permits drainage of the liquid and partial dewatering of the web.

Generally, the laminates of the present invention do not contain nonwoven materials such as meltblown, coform, airlaid, bonded-carded web materials, hydroentangled materials, spunlace materials, and combinations thereof. Rather, the laminates are formed by adhesively bonding wet-laid tissue webs in facing arrangement with one another, where each of the wet-laid tissue webs form a ply.

The laminates of the present invention generally comprise two, three or four tissue plies by well-known wet-laid papermaking processes such as, for example, creped wet pressed, modified wet pressed, creped through-air dried (CTAD) or uncreped through-air dried (UCTAD). For example, creped tissue webs may be formed using either a wet pressed or modified wet pressed process such as those disclosed in U.S. Pat. Nos. 3,953,638, 5,324,575 and 6,080,279, the disclosures of which are incorporated herein in a manner consistent with the instant application. In these processes the embryonic tissue web is transferred to a Yankee dryer, which completes the drying process, and then creped from the Yankee surface using a doctor blade or other suitable device.

In other instances, the tissue plies are made by a through-air dried process known in the art. In such processes the embryonic web is noncompressively dried. For example, textured tissue plies may be formed by either creped or uncreped through-air dried processes. Particularly preferred are uncreped through-air dried webs, such as those described in U.S. Pat. No. 5,779,860, the contents of which are incorporated herein in a manner consistent with the present disclosure.

In still other instances the tissue plies may be manufactured by a process including the step of using pressure, vacuum, or air flow through the wet web (or a combination of these) to conform the wet web into a shaped fabric and subsequently drying the shaped sheet using a Yankee dryer, or series of steam heated dryers, or some other means, including but not limited to tissue made using the ATMOS process developed by Voith or the NTT process developed by Metso; or fabric creped tissue, made using a process including the step of transferring the wet web from a carrying surface (belt, fabric, felt, or roll) moving at one speed to a fabric moving at a slower speed (at least 5 percent slower) and subsequently drying the sheet. Those skilled in the art will recognize that these processes are not mutually exclusive, e.g., an uncreped TAD process may include a fabric crepe step.

The instant multi-ply tissue product may be constructed from two or more plies that are manufactured using the same or different tissue making techniques. In a particularly preferred embodiment, the multi-ply tissue product comprises two or more plies, such as two, three or four plies where each of the plies comprise a wet-pressed tissue ply, and where each ply has a basis weight greater than about 10 gsm, such as from about 10 to about 45 gsm, such as from about 10 to about 42 gsm. In a particularly preferred embodiment, each of the plies have substantially similar basis weights and the upper most ply comprises a plurality of macrofolds.

Regardless of the tissue making process used to produce the individual plies, the resulting multi-ply tissue product comprises at least two plies that are adhesively attached to one another by an ion triggerable binder. In a particularly preferred embodiment both the first and second tissue plies 20, 30 are wet-laid tissue plies and comprise softwood kraft pulp fibers. In still other embodiments the first and second tissue plies 20, 30 are through-air dried tissue plies consisting essentially of softwood kraft pulp fibers and having a basis weight from at least about 10 gsm, such as from about 10 to about 60 gsm, such as from about 15 to about 45 gsm.

Figure 2:
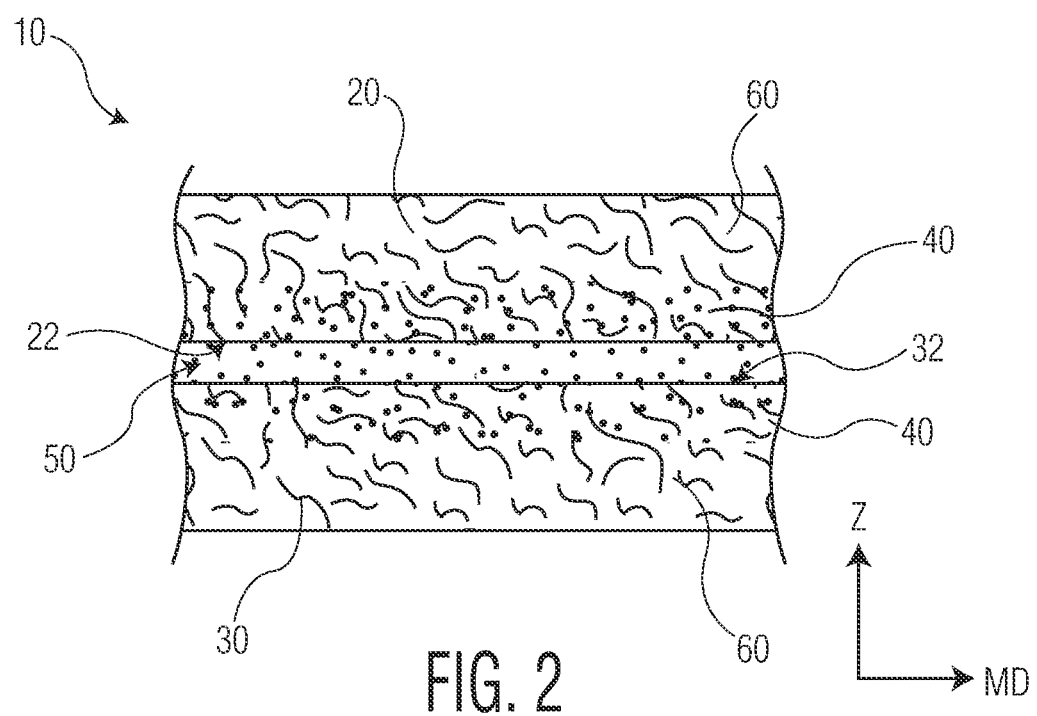
FIG. 2 is a cross-sectional view of a dispersible wet wipe of the present invention with its thickness exaggerated to show detail.

With reference now to FIG. 2, the dispersible wet wipe 10 comprises first and second plies 20, 30, which comprise a plurality of papermaking fibers 60. The plies 20, 30 each have an outer surface 22, 32 and an adhesive 40 disposed thereon. The outer surfaces 22, 32 are brought together in facing relation and bonded together by the adhesive 40 along an interface 50.

In the illustrated embodiment an adhesive 40 has been applied as a coating to both of the outer surfaces 22, 32. In particular embodiments, the binder is applied as randomly distributed deposits binder on each of the outer surfaces. "Randomly distributed deposits" as used herein means that the elements of binder that form the coating are applied without any predetermined pattern, but are instead randomly applied in a continuous, uninterrupted operation, such as via a continuous mist spray, a continuous rotary print coater, a continuous brush coater, or the like. It is understood that at a microscopic level, the deposits of binder may have space between them; "randomly distributed deposits" is meant to distinguish from, for example, an application having a distinct, predetermined, repeating pattern that is visible to the naked eye.

Figure 3:
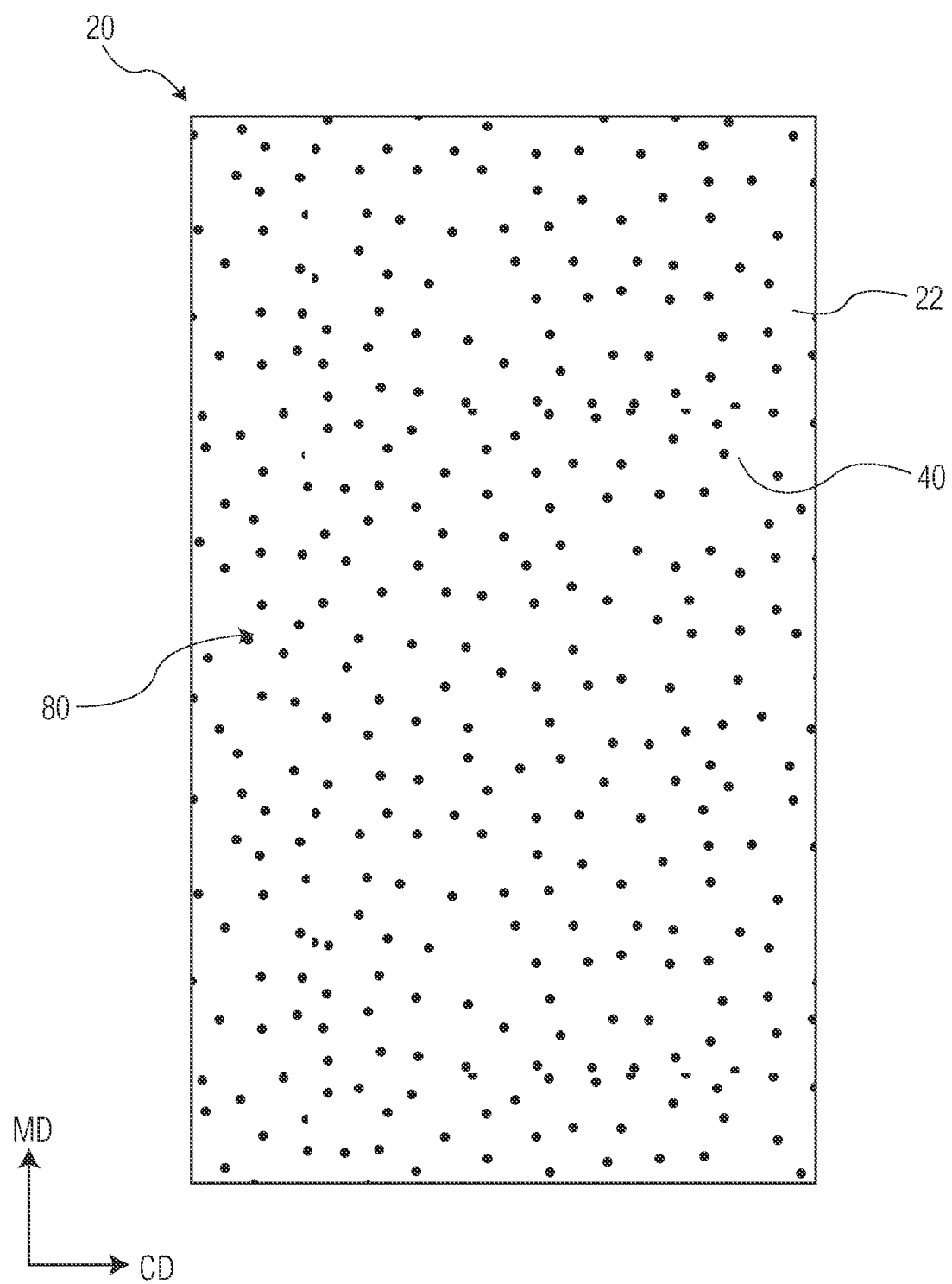
FIG. 3 is an adhesive pattern useful in preparing a dispersible wet wipe according to one embodiment of the present invention.

One example of a random pattern 80 of adhesive 40 useful in the present invention is illustrated in FIG. 3. The adhesive 40 may be applied in a random pattern 80 to a first outer surface 22 of a tissue ply 20 by a continuous, uninterrupted operation, such as via a continuous mist spray, a continuous rotary print coater, a continuous brush coater, or the like.

In other embodiments the binder may be applied in a pattern on one or more of the tissue ply outer surfaces. In a particularly preferred embodiment, the binder is applied in an intermittent pattern by roll printing the binder onto the ply outer surface. "Intermittent" with respect to a particular pattern means applied in a manner such that regions that include the binder alternate with regions that don't include the binder. In particular embodiments, the intermittent pattern is a lattice pattern. Examples of suitable intermittent patterns include an acorn pattern, a honeycomb pattern, a bow-tie pattern, a hound's tooth pattern, a herringbone pattern, a chessboard pattern, and the like.

Figure 4:
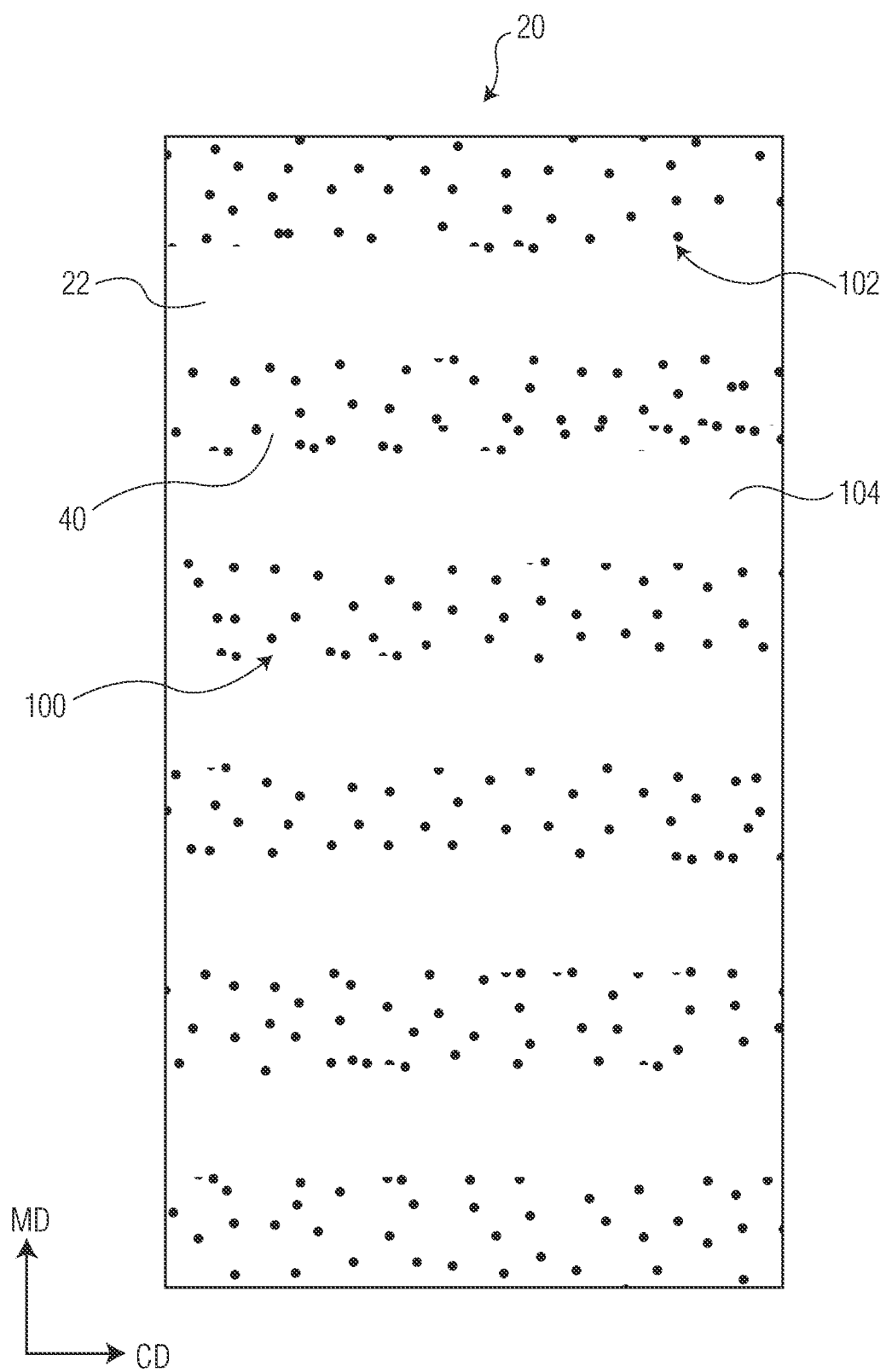
FIG. 4 is another adhesive pattern useful in preparing a dispersible wet wipe according to one embodiment of the present invention.

Referring to FIG. 4, an intermittent pattern 100 useful in the present invention is illustrated. The intermittent pattern 100 comprises continuous, optionally parallel, lines 102 of adhesive 40 that extend in a primarily cross-machine direction (CD). The pattern 100 further comprises intermittent portions 104 between the lines 102 that are substantially free from an adhesive.

With reference again to FIG. 2, although the adhesive 40 is generally applied to the tissue ply outer surfaces 22, 32, the binder may disperse into the tissue ply in the z-direction. The migration of the binder from the tissue ply surface into the interior of the ply is generally random, resulting in a non-uniform z-directional gradient of the adhesive within the tissue ply. While the z-directional gradient of the adhesive may be random, in certain instances, the highest concentration of the adhesive is located at the outer surface of the tissue ply. Further, the adhesive may not migrate entirely throughout the z-direction of the tissue ply, but rather be located in proximity of the outer surface.

The percentage of the outer ply surface area that is treated with binder may vary. "Binder surface area" as used herein means the area bounded by the cumulative footprint upon which the binder is applied, without regard to the microscopic space between individual deposits of binder. In particular embodiments, the binder surface area is 100 percent of the first surface area. In other embodiments the binder surface area is at most 75 percent, at most 50 percent, at most 25 percent.

Just as the surface area of the ply treated with binder may vary, the amount of binder applied to one or more of the tissue plies may also vary. In certain embodiments, the amount of binder applied to one or more of the tissue plies may be about 1.5 grams per square meter (gsm) or more, such as 2.0 gsm or more, such as about 4.0 gsm or more. In certain embodiments, binder is applied to an outer surface of first and second tissue plies and the total binder add-on is from about 3.0 to about 15 gsm, such as from about 4.0 to about 10 gsm.

In particularly preferred embodiments, the adhesive is a triggerable binder. A variety of triggerable binders may be used. One type of triggerable binder is a dilution triggerable binder. Examples of dilution triggerable binders include ion-sensitive polymers, which may be employed in combination with a wetting composition in which the insolubilizing agent is a salt. Other dilution triggerable binders may also be employed, wherein these dilution triggerable binders are used in combination with wetting agents using a variety of insolubilizing agents, such as organic or polymeric compounds.

Although the triggerable binder may be selected from a variety of polymers, including temperature sensitive polymers and pH-sensitive polymers, the triggerable binder may preferably be the dilution triggerable binder, comprising the ion-sensitive polymer. If the ion-sensitive polymer is derived from one or more monomers, where at least one contains an anionic functionality, the ion-sensitive polymer is referred to as an anionic ion-sensitive polymer. If the ion-sensitive polymer is derived from one or more monomers, where at least one contains a cationic functionality, the ion-sensitive polymer is referred to as a cationic ion-sensitive polymer. An exemplary anionic ion-sensitive polymer is described in U.S. Pat. No. 6,423,804, which is incorporated herein in its entirety by reference.

Examples of cationic ion-sensitive polymers are disclosed in the following U.S. Patent Application Publication Nos.: 2003/0026963, 2003/0027270, 2003/0032352, 2004/0030080, 2003/0055146, 2003/0022568, 2003/0045645, 2004/0058600, 2004/0058073, 2004/0063888, 2004/0055704, 2004/0058606, and 2004/0062791, all of which are incorporated herein by reference in their entirety, except that in the event of any inconsistent disclosure or definition from the present application, the disclosure or definition herein shall be deemed to prevail.

Desirably, the ion-sensitive polymer may be insoluble in the wetting composition, wherein the wetting composition comprises at least about 0.3 weight percent of an insolubilizing agent which may be comprised of one or more inorganic and/or organic salts containing monovalent and/or divalent ions. More desirably, the ion-sensitive polymer may be insoluble in the wetting composition, wherein the wetting composition comprises from about 0.3 to about 3.5 percent by weight of an insolubilizing agent which may be comprised of one or more inorganic and/or organic salts containing monovalent and/or divalent ions. Even more desirably, the ion-sensitive polymer may be insoluble in the wetting composition, wherein the wetting composition comprises from about 0.5 to about 3.5 percent by weight of an insolubilizing agent which comprises one or more inorganic and/or organic salts containing monovalent and/or divalent ions. Especially desirable, the ion-sensitive polymer may be insoluble in the wetting composition, wherein the wetting composition comprises from about 1 to about 3 percent by weight of an insolubilizing agent which comprises one or more inorganic and/or organic salts containing monovalent and/or divalent ions. Suitable monovalent ions include, but are not limited to, Na+ ions, K+ ions, Li+ ions, NH4+ ions, low molecular weight quaternary ammonium compounds (e.g., those having fewer than 5 carbons on any side group), and a combination thereof. Suitable divalent ions include, but are not limited to, Zn2+, Ca2+ and Mg2+. These monovalent and divalent ions may be derived from organic and inorganic salts including, but not limited to, NaCl, NaBr, KCl, N H4Cl, Na2SO4, ZnCl2, CaCl2, MgCl2, MgSO4, and combinations thereof. Typically, alkali metal halides are the most desirable monovalent or divalent ions because of cost, purity, low toxicity, and availability. A desirable salt is NaCl.

In a preferred embodiment, the ion-sensitive polymer may desirably provide the wipe substrate with sufficient in-use strength (typically >300 grams per linear inch) in combination with the wetting composition containing sodium chloride. These wipe substrates may be dispersible in tap water, desirably losing most of their wet strength (<200 grams per linear inch) in one hour or less.

In another preferred embodiment, the ion-sensitive polymer may comprise the cationic sensitive polymer, wherein the cationic sensitive polymer is a cationic polyacrylate that is the polymerization product of 96 mol % methyl acrylate and 4 mol % [2-(acryloyloxy)ethyl]trimethyl ammonium chloride.

In certain instances, the adhesive may comprise a triggerable binder and/or the cobinder. When the binder composition comprises the triggerable binder and the cobinder, the triggerable binder and the cobinder may preferably be compatible with each other in aqueous solutions to: 1) allow for facile application of the binder composition to the fibrous substrate in a continuous process and 2) prevent interference with the dispersibility of the binder composition. Therefore, if the triggerable binder is the anionic ion-sensitive polymer, cobinders which are anionic, nonionic, or very weakly cationic may be preferred. If the triggerable binder is the cationic ion-sensitive polymer, cobinders which are cationic, nonionic, or very weakly anionic may be added. Additionally, the cobinder desirably does not provide substantial cohesion to the wipe substrate by way of covalent bonds, such that it interferes with the dispersibility of the wipe substrate.

The presence of the cobinder may provide a number of desirable qualities. For example, the cobinder may serve to reduce the shear viscosity of the triggerable binder, such that the binder composition may be more easily sprayed compared to the triggerable binder alone. By use of the term "sprayable" it is meant that these polymers may be applied to the fibrous material or substrate by spraying, allowing the uniform distribution of these polymers across the surface of the substrate and penetration of these polymers into the substrate. The cobinder may also reduce the stiffness of the wipe substrate compared to the stiffness of a wipe substrate to which only the triggerable binder has been applied. Reduced stiffness may be achieved if the cobinder has a glass transition temperature (Tg), which is lower than the Tg of the triggerable binder. In addition, the cobinder may be less expensive than the triggerable binder and by reducing the amount of triggerable binder needed, may serve to reduce the cost of the binder composition. Thus, it may be desirable to use the highest amount of cobinder possible in the binder composition such that it does not jeopardize the dispersibility and in-use strength properties of the wet wipe. In a preferred embodiment, the cobinder replaces a portion of the triggerable binder in the binder composition and permits a given strength level to be achieved, relative to a wet wipe having approximately the same tensile strength but containing only the triggerable binder in the binder composition, to provide at least one of the following attributes: lower stiffness, better tactile properties (e.g. lubricity or smoothness), or reduced cost.

In one embodiment, the cobinder present in the binder composition, relative to the mass of the binder composition, may be about 10 percent or less, more desirably about 15 percent or less, more desirably 20 percent or less, more desirably 30 percent or less, or more desirably about 45 percent or less. Exemplary ranges of cobinder relative to the solid mass of the binder composition may include from about 1 to about 45 percent, from about 25 to about 35 percent, from about 1 to about 20 percent and from about 5 to about 25 percent.

The cobinder may be selected from a wide variety of polymers, as are known in the art. For example, the cobinder may be selected from the group consisting of poly(ethylene-vinyl acetate), poly(styrene-butadiene), poly(styrene-acrylic), a vinyl acrylic terpolymer, a polyester latex, an acrylic emulsion latex, polyvinyl chloride), ethylene-vinyl chloride copolymer, a carboxylated vinyl acetate latex, and the like. A variety of additional exemplary cobinder polymers are discussed in U.S. Pat. No. 6,653,406 and U.S. Patent Application Publication No. 2003/00326963, which are both incorporated herein by reference in their entirety. Particularly preferred cobinders include Airflex® EZ123 and Airflex® 110.

The wipe further includes a wetting composition. The wetting composition may include a first insolubilizing agent, and optionally a second insolubilizing agent. Desirably, the adhesive is insoluble (stable) in the presence of the wetting composition containing one or more insolubilizing agents. In other words, the one or more insolubilizing agents render stable the adhesive, prior to the wipe being flushed into a toilet or otherwise contacted by tap water. "Stable" as used herein means continuing to hold the fibers of the wipe together as intended for use of the wipe.

The liquid wetting composition can be any liquid that can be absorbed into the wipe substrate and may include any suitable components that provide the desired wiping properties. For example, the solution may include water, emollients, surfactants, fragrances, preservatives, organic or inorganic acids, chelating agents, pH buffers, or combinations thereof, as are well known to those skilled in the art. Further, the wetting composition may also contain lotions, medicaments, and/or antimicrobials. The wetting composition may contain additional agents that impart a beneficial effect on skin or hair and/or further act to improve the aesthetic feel of the compositions and wipes described herein. Examples of suitable skin benefit agents include emollients, sterols or sterol derivatives, natural and synthetic fats or oils, viscosity enhancers, rheology modifiers, polyols, surfactants, alcohols, esters, silicones, clays, starch, cellulose, particulates, moisturizers, film formers, slip modifiers, surface modifiers, skin protectants, humectants, sunscreens, and the like.

The wetting composition may be incorporated into the wipe in an add-on amount of from about 10 to about 600 percent, more desirably from about 100 to about 500 percent, and even more desirably from about 200 to about 300 percent of the dry weight of the substrate. In one example, the wetting composition contains water. The wetting composition can in particular embodiments contain water in an amount of from about 40 to about 99 percent of the total weight of the solution.

In certain embodiments the dispersible wet wipe of the present invention has a cross-machine direction wet tensile strength ("CDWT") of greater than 150 g/in, more particularly greater than 175 g/in, and more particularly great than 200 g/in, such as from about 150 to about 300 g/in, such as from about 175 to about 250 g/in. Having a CDWT strength in this range can help prevent the wipe from tearing during dispensing or during personal hygiene use.

In yet other embodiments adhesively bonding the tissue plies together to form a dispersible laminate provides the laminate with improved tensile strength, particularly improved geometric mean wet tensile strength (GMWT). Desirably, the dispersible wet wipes have a GMWT strength of at least about 250 g/in, such as at least about 275 g/in, such as at least about 300 g/in, such as from about 250 to about 500 g/in, such as from about 275 to about 400 g/in.

In particular embodiments, the wipe has a CDWT after soaking for 15 minutes in room temperature tap water of less than 100 g/in, such as from about 50 to about 100 g/in. In other embodiments, the wipe preferably has a 60-min post-soak CDWT of less than 80 g/in, and more preferably less than 65 g/in. Having a post-soak CDWT in this range bears on the wipe's ability to lose strength and break down in wastewater conveyance infrastructure after flushing, as the minimum time that a wipe would reside in a home drain line after being flushed is 15 minutes (although typically wipes reside in the home drain line longer than 15 minutes).

In still other embodiments, the present invention provides a dispersible wipe comprising two or more wet-laid tissue layers adhesively bonded to one another having a CDWT of greater than 200 g/in, more particularly greater than 225 g/in, and more particularly great than 250 g/in, and a Slosh-Box Break-Up Time of less than about 60 minutes, more particularly less than about 45 minutes, and more particularly less than about 30 minutes, in accordance with the test procedure set forth below.

In a particularly preferred embodiment the present invention provides a dispersible wipe comprising two or more wet-laid tissue layers adhesively bonded to one another and comprising wood pulp fibers and from about 2 to about 10 grams per square inch adhesive disposed between the layers, the product having a GMWT from about 275 to about 400 g/in and a Slosh Time less than about 30 minutes, such as from about 2 to about 30 minutes, such as from about 5 to about 20 minutes.

Figure 5:
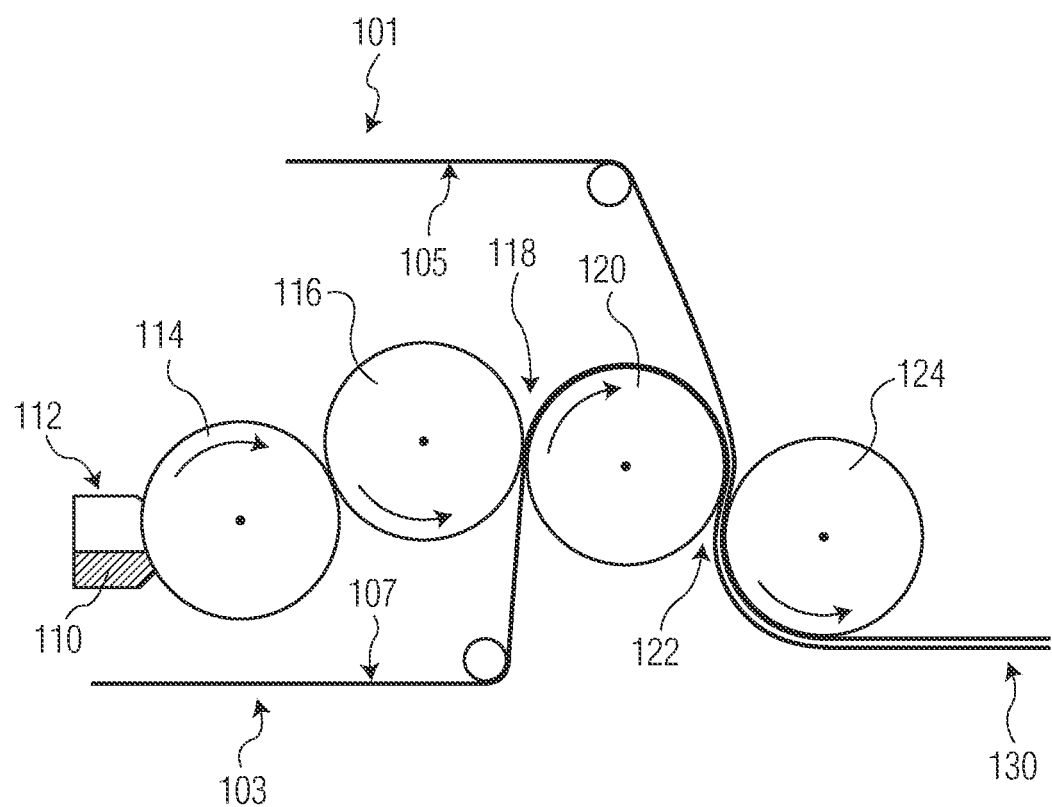
FIG. 5 is a schematic view of a process for manufacturing a dispersible wet wipe according to one embodiment of the present invention.

Turning now to FIG. 5, one method of manufacturing a wipe according to the present invention is illustrated. The method includes providing first and second tissue webs 101, 103. Each web having an outer surface 105, 107. In certain instances, the webs may have a basis weight from about 10 to about 60 gsm, such as from about 15 to about 40 gsm and more preferably from about 20 to about 35 gsm.

An adhesive solution 110 is pumped into a reservoir or doctor chamber 112 and then applied onto antilox roll 114 by doctor chamber 112 using two doctor blades that keep the doctor chamber 112 sealed. Antilox roll, used in certain embodiments of the present invention, is made by placing a coating (approximately 0.020 inches thick in some cases) of chromium oxide on the outer perimeter of a round steel roll. The chromium oxide may then be etched with a laser. The laser burns microscopic gravure cells onto the surface of the chromium oxide. The cells fill up with adhesive 110 as the roll 114 is rotated.

The adhesive 110 is mechanically transferred from the anlilox roll 114 onto flexographic printing roll 116, which may be a rubber flexographic printing roll. A specific metered amount of the adhesive 110 is then transferred, due to capillary forces, out of the gravure cells on antilox roll 114 and onto flexographic printing roll 116. This flexographic printing roll 116, which may have an engraved pattern on its surface, contacts the outer surface 107 of the second web 103 as the web 103 passes through a nip 118 created by the flexographic printing roll 116 and a backing roll 120. As the web 103 passes through the nip 118 the adhesive 110 is applied to its outer surface 107.

This second web 103, now containing the adhesive 110 on its outer surface 107 is met by untreated first tissue web 101, and the two webs 101, 103 are adhesively joined in a facing arrangement by passing through a second nip 122 formed between the backing roll 120 and a marrying roll 124. The two-ply, adhesively bonded, product 130 may be further converted in additional processes. Thus, the present invention produces a dispersible tissue product comprising two tissue plies wherein the adhesive is between the layers and not on the exterior as in known products.

For ease of application, the adhesive may be dissolved in water, or in a non-aqueous solvent, such as methanol, ethanol, acetone, or the like, with water being the preferred solvent. The amount of binder dissolved in the solvent may vary depending on the polymer used and the application method. Desirably, the adhesive solution contains less than about 18 percent by weight of adhesive composition solids. More desirably, the adhesive solution contains less than 16 percent by weight of adhesive composition solids.

Figure 6:
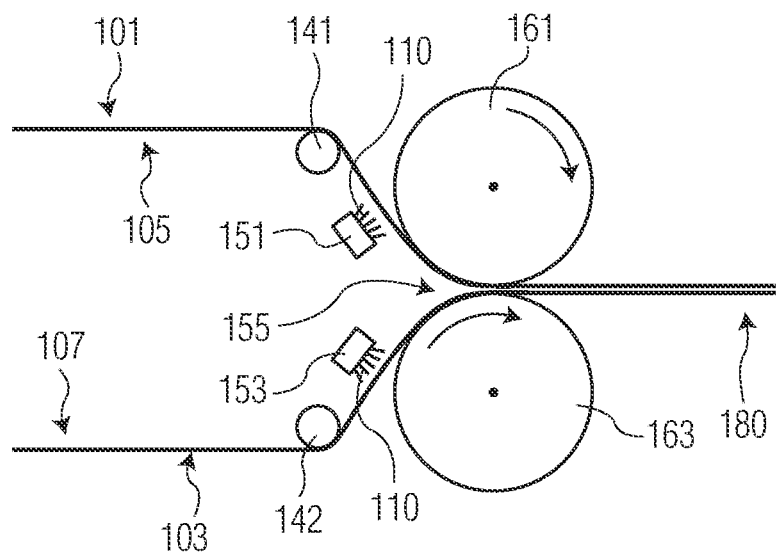
FIG. 6 is a schematic view of a process for manufacturing a dispersible wet wipe according to another embodiment of the present invention.
Figure 7:
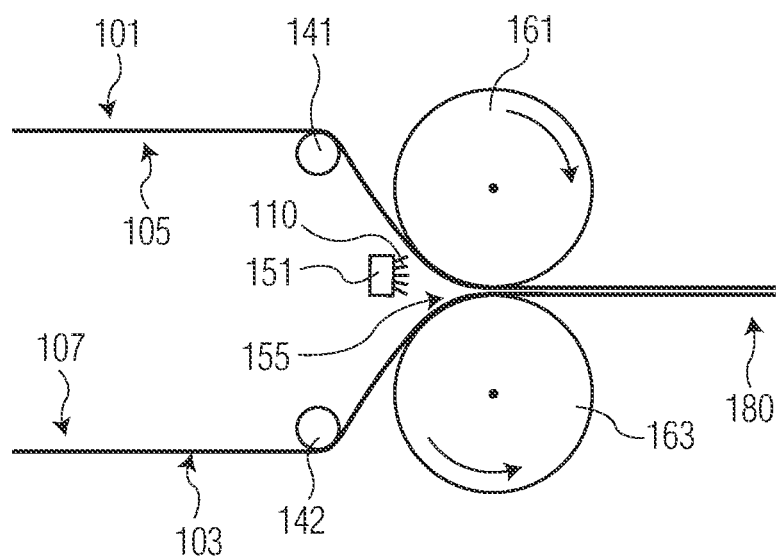
FIG. 7 is a schematic view of a process for manufacturing a dispersible wet wipe according to yet another embodiment of the present invention.

In alternative embodiments of the present invention, such as that illustrated in FIGS. 6 and 7, the adhesive may be applied to the outer surfaces of one or more of the tissue plies by spraying. For example, with reference to FIG. 6, individual tissue webs 101 and 103 are unwound from the reel stands and threaded over carrier rolls 141, 142. First and second spray assemblies 151, 153 are positioned between carrier rolls 141, 142 and a nip 155 created by opposed first and second rolls 161, 163. The spray assemblies 151, 153 are further positioned beneath, and across the width of (i.e. transverse to the movement of) each of the individual tissue webs 101 and 103 to spray an adhesive 110 to an outer surface 105, 107 of each web 101, 103.

The spray assemblies may include a row of nozzles positioned in a housing which extends across the width of the web. Nozzles may be spaced apart from one another to provide the desired degree of coverage and in certain instances may be positioned such that any given point on the web generally receives output from two nozzles. Each nozzle is generally connected to an adhesive supply and atomizing air supply and a control air supply. The housing may include an axle that extends across the width of the housing and controls the rotation of a baffle plate. The housing may also include a trailing lip extending from the rear (trailing) edge.

After adhesive 110 is sprayed onto the outer surface 105, 107 of each web 101, 103, the webs are combined in facing arrangement as they pass through a nip 155. The nip 155 may be formed by a pair of opposed rolls 161, 163, which in certain instances may be urged against one another to apply a pressure to the nip. Formation of nips in this manner is common in the converting of tissue products and generally, it is desirable to load these rolls to one another at a set force. One of skill in the art will recognize this to be known generally as the nip force and is generally provided (or referenced) in terms of force per unit length. By convention herein, the units are known as pounds per linear inch (PLI or pli). In certain embodiments the force observed between the pair of opposed rolls 161, 163 is at least about 5 pli, such as from about 5 to about 60 pli, such as from about 10 to about 40 pli.

The adhesive 110 applied by the first and second spray assemblies 151, 153 may have the same chemical composition, and perhaps even the same level of concentration prior to application. In other embodiments the chemical composition of the adhesives is different, and they are applied at different add-on levels. In still other embodiments, adhesive 110 applied by the first and second spray assemblies 151, 153 may be applied in the same pattern or may be applied in different patterns to the outer surface 105, 107 of each web 101, 103.

There can be advantages to applying the first and second binders in two separate steps and by two different application techniques. Without wishing to limit the scope of the invention, it is believed that by applying one stage of binder in a low-level, "all over" coating, and another stage of binder in a pattern having repeating gaps therein, an optimal balance between in-use strength and good post-flush dispersibility can be struck.

In other embodiments, such as that illustrated in FIG. 7, the laminate 180 is produced using a single spray assembly 151 that is positioned to apply adhesive 110 to the outer surfaces 105, 107 of each web 101, 103 immediately prior to a nip 155. Individual tissue webs 101 and 103 are unwound from the reel stands and threaded over carrier rolls 141, 142. The single spray assembly 151 is positioned between the carrier rolls 141, 142 and the nip 155 to spray adhesive 110 onto the outer surfaces 105, 107. After adhesive 110 is sprayed onto the outer surface 105, 107 of each web 101, 103, the webs are combined in facing arrangement as they pass through a nip 155.

After the plies are attached in facing arrangement by passing the adhesively treated webs 101, 103 through the nip 155, the multi-ply adhesively bonded laminate 180 may be wound into a roll and/or subjected to further treatment or converting.

In one particularly preferred embodiment, multi-ply adhesively bonded laminate is conveyed through a dryer to cure the adhesive. In certain instances, the multi-ply adhesively bonded laminate may be transferred to a through-air dryer fabric and conveyed over a through-air dryer to dry the laminate and/or cure the adhesive. In some embodiments, the through-drying fabric is a course, highly permeable, fabric. In alternative embodiments, other methods may be used as a substitute for, or in conjunction with, the through-air dryer to dry the laminate and/or cure the adhesive. For example, in some embodiments the through-air dryer may be used without a fabric. In other suitable embodiments of the disclosure, other drying systems known in the art (i.e., other than a through-air dryer system, e.g., drying cans, infra-red (IR), ovens) may be used so long as they do not deviate from the scope of this disclosure.

When using an ethylene vinyl acetate copolymer adhesive, the drying apparatus can be heated to a temperature of between about 120 to about 170° C.

The dried and/or cured laminate may be wound into a roll or reel. After winding, subsequent converting steps known to those of skill in the art can be used to transform the textured air laid substrate into a plurality of wet wipes. For example, the textured air laid substrate can be cut into individual wipes, the individual the wipes folded into a stack, the stack of wet wipes moistened with a liquid wetting composition, and then the stack of wet wipes can be placed into a dispenser.

TEST METHODS

Tensile Strength

For purposes herein, tensile strength may be measured using a Constant Rate of Elongation (CRE) tensile tester using a 1-inch jaw width (sample width), a test span of 3 inches (gauge length), and a rate of jaw separation of 25.4 centimeters per minute after maintaining the sample at the ambient conditions of 23±2 degrees Celsius and 50±5 percent relative humidity for four hours before testing the sample at the same ambient conditions. The wet wipes are cut into 1-inch wide by 5.5 inches long strips cut from the center of the wipes in the cross-machine direction (CD) orientation. The "cross-machine direction wet tensile strength" ("CDWT") is the peak load in grams-force per inch of sample width when a specimen is pulled to rupture in the cross-machine direction.

The instrument used for measuring tensile strength was an MTS Systems Sinergie 200 model. The data acquisition software was MTS TestWorks® for Windows Ver. 4.0 commercially available from MTS Systems Corp., Eden Prairie, MN. The load cell was an MTS 50 Newton maximum load cell. The gauge length between jaws is 3 inches. The top and bottom jaws are operated using pneumatic-action with maximum 80 P.S.I. The break sensitivity is set at 40 percent. The data acquisition rate is set at 100 Hz (i.e., 100 samples per second). The sample is placed in the jaws of the instrument, centered both vertically and horizontally. The test is then started and ended when the force drops by 40 percent of peak. The peak load expressed in grams-force is recorded as the "CDWT" of the specimen. Eight representative specimens were tested for each product and the average peak load determined.

To simulate post-flush tensile strength measurements, five specimens are flushed down a toilet with water at room temperature, allowed to rest in the drain line for 15 or 60 minutes, and then measured for CDWT as described above.

Dispersibility

This test method evaluates the dispersibility of flushable consumer products, simulating travel through a wastewater conveyance system ("Slosh Box Test"). In this test method, a plastic tank is loaded with a product and 2 liters of tap water at room temperature. The container is then tipped back and forth at 26 oscillations per minute to simulate the movement of wastewater in the collection system. The time required for the wipe specimen to break up entirely into pieces that measure at most approximately 1 sq. in. (6.5 sq. cm) is recorded. The amount of time to reach this point is measured ("Slosh-Box Break-Up Time"). The construction and motion of the apparatus is conducted as set forth in the "Guidelines for Assessing the Flushability of Disposable Nonwoven Products, Third Edition, FG502—Slosh Box Disintegration Test," available from the "Association of the Nonwovens Fabrics Industry," 1100 Crescent Green, Suite 115, Cary, NC, 27518, www.inda.org.

EXAMPLES

Each of the samples, control and inventive, comprise one or more uncreped through-air dried ("UCTAD") tissue plies. Each of the UCTAD plies are formed from a fiber furnish consisting essentially of bleached Northern softwood kraft (NSWK) fibers. The number of plies and their respective basis weights for the control and inventive sample are set forth in Table 1, below.

TABLE 1

| Sample | Number of Plies | Target Ply Basis Weight (gsm) |
| --- | --- | --- |
| Control | 1 | 48 |
| Inventive | 2 | Ply 1-25 gsm |
|  |  | Ply 2-35 gsm |

The inventive samples were made using adhesive comprising a triggerable binder composition having both a binder and a cobinder. The binder was cationic polyacrylate which is the polymerization product of 92 mol % methyl acrylate, 4 mol % hydroxypropyl acrylate and 4 mol % [2-(acrylolyoxy)ethyl] trimethyl ammonium chloride. The cobinder was VINNAPAS® EZ123, available from Wacker Chemi AG. The binder and the cobinder, both supplied in solution, were mixed together to yield a 70:30 binder to cobinder dry-weight ratio.

The inventive dispersible laminate was prepared by unwinding a first tissue ply and applying the triggerable binder composition to an outer surface by spraying. The triggerable binder composition was sprayed using a single Unijet® spray nozzle, Nozzle type 800017, manufactured by Spraying Systems Co., Wheaton, IL, operating at 80 psi. The triggerable binder composition (in aqueous solution at 15.5 percent) was sprayed onto the outer surface of a first tissue ply to yield an adhesive dry solids basis weight of 4 grams per square meter.

After being sprayed with the triggerable binder composition, the first tissue ply was brought into facing relation with the second tissue ply and passed through a nip to form an adhesively bonded two-ply laminate. The two-ply laminate was passed through a calender nip loaded at a pressure of 12 pli and then passed through a series of dryers comprising a through-air dryer and an infra-red dryer operating from about 220 to 260° C. at a speed of about 200 feet per minute (fpm) to dry the web. The dried web was then passed through the same series of driers a second time at a speed of about 100 to about 200 fpm to cure the binder.

A control wet wipe was prepared by unwinding a single ply of UCTAD web having a basis weight of about 48 gsm and applying the triggerable binder composition to an outer surface by spraying. The triggerable binder composition was sprayed using a single Unijet® spray nozzle, Nozzle type 800017, manufactured by Spraying Systems Co., Wheaton, IL, operating at 80 psi. The triggerable binder composition (in aqueous solution at 15.5 percent) was sprayed onto the outer surface of a first tissue ply to yield an adhesive dry solids basis weight of 4 grams per square meter.

After being sprayed with the triggerable binder composition, the web was dried through a series of dryers comprising a through-air dryer and an infra-red dryer operating from about 220 to 260° C. at a speed of about 200 feet per minute (fpm) to dry the web. The dried web was then passed through the same series of driers a second time at a speed of about 100 to about 200 fpm to cure the binder.

A wetting composition was added to both the control and inventive wipes at an add-on rate of 215 percent of the weight of the dry wipe, and the wetting composition comprised 2 weight-percent of sodium chloride. The wetted web was converted into stacks of wipes and stored in moisture-impervious plastic bags.

For each sample, five specimens, roughly 2.5 centimeters by 14 centimeters in dimension, were tested for CDWT, in units of grams per linear inch, and additional specimens were tested for CDWT after being soaked for sixty (60) minutes in tap water at room temperature, and results averaged. The cross-machine direction wet tensile strength was measured because in certain dispensing formats, the extraction force placed upon the wipe during dispensing is in the cross-machine direction. The 60-minute soak was intended to simulate the time that a wipe typically resides in a home drain line after being flushed.

The time required for each wipe to break apart into pieces, none of which were larger than approximately one square inch (6.5 square centimeters), was measured via the Slosh-Box test described above.

TABLE 2

|  | Control | Inventive |
|---|---|---|
| Adhesive Add-on (gsm) | 4 | 4 |
| Bone-Dry Basis Wt. (gsm) | 48 | 59.1 |
| CDWT (g/in) | 211 | 185 |
| MDWT (g/in) | 424 | 387 |
| GMWT (g/in) | 299 | 268 |
| CDWT Strength 1 hr Soak | 31 | 22 |
| Strength Loss after 1 hr Soak (%) | 85% | 88% |
| Slosh Box Break-Up Time (min) | 66.5 | 17.8 |

EMBODIMENTS

First embodiment: A dispersible adhesively bonded wet tissue laminate comprising: a first tissue ply and a second tissue ply, each ply having a first outer surface and a second outer surface, the first and second plies arranged in facing relation with one another such that the second outer surfaces face one another; an adhesive disposed between the first and second tissue ply second outer surfaces; and a wetting composition.

Second embodiment: The laminate of the first embodiment wherein the tissue laminate has a geometric mean wet tensile strength (GMWT) greater than about 250 g/in and a Slosh Time less than about 60 minutes.

Third embodiment: The laminate of the first or second embodiment wherein the first and second tissue plies are wet-laid tissue plies.

Fourth embodiment: The laminate of any one of the first through third embodiments wherein the first and second tissue plies are wet-laid tissue plies having a basis weight from about 10 to about 60 grams per square meter (gsm).

Fifth embodiment: The laminate of any one of the first through fourth embodiments wherein the first and second tissue plies are wet-laid and through-air dried tissue plies having a basis weight from about 10 to about 30 gsm.

Sixth embodiment: The laminate of any one of the first through fifth embodiments wherein the first and second tissue plies are substantially identical.

Seventh embodiment: The laminate of any one of the first through sixth embodiments wherein the first and second tissue plies differ in at least basis weight, fiber composition, or geometric mean tensile strength.

Eighth embodiment: The laminate of any one of the first through seventh embodiments wherein the tissue laminate has a cross-machine direction wet tensile strength (CDWT) greater than about 150 g/in.

Ninth embodiment: The laminate of any one of the first through eighth embodiments wherein the tissue laminate has a GMWT from about 175 to about 300 g/in, a CDWT from about 150 to about 250 g/in, and a Slosh Time less than about 20 minutes.

Tenth embodiment: The laminate of any one of the first through ninth embodiments wherein the adhesive add-on ranges from about 2.0 to about 10 gsm.

Eleventh embodiment: The laminate of any one of the first through tenth embodiments wherein the wetting composition add-on amount ranges from about 10 to about 600 percent by weight of the dry tissue laminate and the wetting composition comprises water and from about 0.4 and about 3.5 percent, by weight of the wetting composition, of an insolubilizing agent. In certain embodiments the insolubilizing agent comprises an inorganic salt or an organic salt.

Twelfth embodiment: The laminate of any one of the first through eleventh embodiments wherein the adhesive is a triggerable binder composition and is added at an add-on rate of between about 1 and about 4 percent based on the total weight of the dry laminate.

Thirteenth embodiment: The laminate of any one of the first through twelfth embodiments wherein the basis weight of the first and the second tissue plies ranges from about 20 to about 80 grams per square meter.

Fourteenth embodiment: The laminate of any one of the first through thirteenth embodiments wherein the first and second tissue plies comprise an uncreped through-air dried tissue web.

Fifteenth embodiment: The laminate of any one of the first through fourteenth embodiments wherein the laminate does not comprise an airlaid nonwoven layer.

What is claimed is:

1. A method of making a dispersible adhesively bonded wet tissue laminate:
   (a) providing a first wet-laid tissue web having a first surface and a second surface;
   (b) providing a second wet-laid tissue web having a first surface and a second surface;
   (c) applying an adhesive to the first surface of the first wet-laid tissue web to yield an adhesively treated first surface of the first wet-laid tissue web;
   (d) bringing the adhesively treated first surface of the first wet-laid tissue web first surface into facing relation with the first surface of the second wet-laid tissue web to yield a two-ply tissue web;
   (e) providing a substantially smooth backing roll and a substantially smooth marrying roll arranged in opposition to one another and forming a nip therebetween;
   (f) passing the two-ply tissue web through the nip to yield an adhesively bonded tissue laminate; and
   (g) applying a wetting composition wetting composition to the adhesively bonded tissue laminate, wherein the add-on amount of the wetting composition ranges from about 10 to about 600 percent by weight of the dry adhesively bonded tissue laminate.

2. The method of claim 1 further comprising the step of heating the adhesively bonded tissue laminate.

3. The method of claim 2 wherein the heating step is carried out at a temperature ranging from about 120° C. to about 170° C.

4. The method of claim 2 wherein the heating step is carried out by conveying the adhesively bonded tissue laminate through a through-air dryer.

5. The method of claim 4 wherein the adhesively bonded tissue laminate is supported by a through-air dryer fabric as it is conveyed through the through-air dryer.

6. The method of claim 1 wherein the step of applying the adhesive is carried out by conveying the first wet-laid tissue web through a nip formed between a flexographic printing roll and a backing roll.

7. The method of claim 1 wherein the step of applying the adhesive is carried out by spraying an adhesive onto the first surface of the first wet-laid tissue web.

8. The method of claim 1 wherein the nip pressure ranges from about 5 pounds per linear inch (pli) to about 60 pli.

9. The method of claim 1 further comprising the step of applying a second binder to the first surface of the second wet-laid tissue web.

10. The method of claim 9 wherein the first and second binders are the same.

11. The method of claim 9 wherein the first and second binders are sprayed onto the first surfaces.

12. The method of claim 9 wherein the first binder is sprayed onto the first surface and wherein the second binder is not sprayed onto the first surface.

13. The method of claim 1 wherein the adhesive add-on ranges from about 2.0 to about 10 gsm.

14. The method of claim 1 wherein the adhesive is a triggerable binder.

15. The method of claim 1 wherein the adhesive is a cationic polyacrylate.

16. The method of claim 9 wherein the first adhesive is a cationic polyacrylate and the second adhesive is a cobinder selected from the group consisting of poly(ethylene-vinyl acetate), poly(styrene-butadiene), poly(styrene-acrylic), a vinyl acrylic terpolymer, a polyester latex, an acrylic emulsion latex, polyvinyl chloride), ethylene-vinyl chloride copolymer, and a carboxylated vinyl acetate latex.

17. The method of claim 1 wherein the first and second wet-laid tissue webs have a basis weight ranging from about 15 to about 40 grams per square meter (gsm).

18. The method of claim 1 wherein the first and second tissue plies are through-air dried tissue plies having a basis weight from about 10 to about 30 gsm.

19. The method of claim 1 wherein the wet adhesively bonded tissue laminate has a geometric mean wet tensile strength (GMWT) greater than about 250 g/in and a Slosh from about 5 to about 20 minutes.

20. The method of claim 1 wherein the wet adhesively bonded tissue laminate has a geometric mean wet tensile strength (GMWT) from about 275 to about 400 g/in.

* * * * *